UNITED STATES PATENT OFFICE.

MAX NEUMANN, OF WITTENBERG, GERMANY, ASSIGNOR TO WESTFÄLISCH-ANHALTISCHE SPRENGSTOFF-AKTIENGESELLSCHAFT, OF BERLIN, GERMANY.

PROCESS OF MAKING PICRIC ACID.

SPECIFICATION forming part of Letters Patent No. 666,627, dated January 22, 1901.

Application filed September 28, 1900. Serial No. 31,383. (No specimens.)

*To all whom it may concern:*

Be it known that I, MAX NEUMANN, a citizen of the Empire of Germany, residing at Wittenberg, in the Kingdom of Prussia and Empire of Germany, have invented a new and useful Process of Producing Picric Acid, of which the following is a specification.

My invention relates to a new and useful process of producing picric acid, which process is independent of the extraordinary alternations in the quoted prices for phenol, which prices rise sometimes to a considerable high rate, this being due to the want of disposable stores.

With regard to the continual increase in the consumption of picric acid it is desirable to use instead of phenol another raw material which is not subject to fluctuating market quotations and is always merchantable in a sufficient quantity so as to allow the production of picric acid at a remunerating price. The process hereinafter described corresponds to the said requirements and is effected by using anilin as the raw material. Anilin is first converted into sulfanilic acid by the action of fuming sulfuric acid in the well-known manner, and the conversion of the sulfanilic acid into picric acid is readily effected from my experience in that the amido group may be exchanged for a hydroxyl group passing over the diazo group in presence of nitric acid.

The mode of practicing my invention is preferably as follows:

One hundred kilograms of crude sulfanilic acid are agitated with water to a thin mass or pulp and a sufficiently-diluted solution of forty kilograms of nitrite of soda is added, so that the whole is dissolved, with the exception of the impurities, which may possibly be in the sulfanilic acid, from which impurities the solution is filtered. This filtrate is mixed with twenty-eight kilograms of sulfuric acid, when the produced diazobenzenesulfonic acid is quantitatively separated. After filtering, the yellowish porous mass, which still contains about twenty per cent. of water, is introduced into nitric acid of such concentration that after this introduction the acid has a strength of about 40° Baumé. The mixture is now slowly warmed until nitrogen is generated, the warming being suspended when said generating ceases, and the solution is then allowed to stand for about thirty-six hours, after which the picric acid is completely deposited. The latter is now drawn off from the fluid standing thereabove, washed, and then through a centrifugal movement is drained and finally dried. Otherwise I can perform my process by slowly agitating one hundred kilograms sulfanilic acid with a solution of forty kilograms nitrite of soda and forty kilograms water and then treating the obtained thick yellow mass in nitric acid of such concentration and quantity that the composition obtained gives three hundred and twenty kilograms of acid of 40° Baumé. The further operations follow as above described.

My process thus described possesses the essential advantage of using anilin instead of phenol as raw material, the latter being subject to the various market quotations. Further, my process is worked in an easy and simple manner and furnishes a very high gain. From fifty kilograms of anilin one hundred and ten kilograms of picric acid have been obtained—that is, ninety per cent. of the possible theoretical gain.

Having now described my invention, I claim—

1. The herein-described process of producing picric acid from anilin, which consists in converting anilin into sulfanilic acid by treating with fuming sulfuric acid, diazotizing the sulfanilic acid by the action of nitrous acid and finally treating the obtained diazobenzenesulfonic acid with nitric acid, substantially as set forth.

2. The herein-described process of producing picric acid from sulfanilic acid which consists in treating it with nitrous acid and then treating the diazobenzenesulfonic acid thus obtained with nitric acid, substantially as set forth.

3. The herein-described process of producing picric acid from diazobenzenesulfonic acid, which consists in treating it with nitric acid, substantially as set forth.

In testimony that I claim the foregoing as my invention, I have signed my name in presence of two subscribing witnesses.

MAX NEUMANN.

Witnesses:
LUDWIG WENGHÖFFER,
CLARA KOHN.